(12) United States Patent
Wagle et al.

(10) Patent No.: US 9,469,803 B2
(45) Date of Patent: Oct. 18, 2016

(54) INVERT EMULSION FLUIDS

(71) Applicant: Halliburton Energy Services, Inc., Houston, TX (US)

(72) Inventors: Vikrant Bhavanishankar Wagle, Mumbai (IN); Shadaab Syed Maghrabi, Thane (IN); Dhanashree Ganjanan Kulkarni, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/511,889

(22) Filed: Oct. 10, 2014

(65) Prior Publication Data

US 2015/0024975 A1 Jan. 22, 2015

Related U.S. Application Data

(63) Continuation-in-part of application No. 13/939,176, filed on Jul. 10, 2013, now abandoned, which is a continuation-in-part of application No. 13/468,022, filed on May 9, 2012.

(51) Int. Cl.
*C09K 8/36* (2006.01)

(52) U.S. Cl.
CPC ....................................... *C09K 8/36* (2013.01)

(58) Field of Classification Search
None
See application file for complete search history.

(56) References Cited

U.S. PATENT DOCUMENTS

| | | | |
|---|---|---|---|
| 3,125,517 A * | 3/1964 | Voda | C09K 8/36 507/131 |
| 7,645,723 B2 | 1/2010 | Kirsner et al. | |
| 2008/0029303 A1* | 2/2008 | Codazzi | E21B 4/00 175/57 |
| 2011/0214864 A1* | 9/2011 | Maghrabi | C09K 8/36 166/294 |
| 2012/0097403 A1 | 4/2012 | Maghrabi et al. | |

FOREIGN PATENT DOCUMENTS

WO 2009/138383 A1 11/2009

OTHER PUBLICATIONS

International Search Report issued in related PCT Application No. PCT/US2013/032733 mailed Jul. 4, 2013, 4 pages.
International Search Report and Written Opinion issued in related PCT Application No. PCT/US2014/045082 mailed Oct. 27, 2014, 11 pages.

* cited by examiner

*Primary Examiner* — Jeffrey Washville
(74) *Attorney, Agent, or Firm* — Tenley R. Krueger; Baker Botts L.L.P.

(57) ABSTRACT

Invert emulsion fluids comprising a fatty dimer diamine having 28 to 48 carbon atoms per molecule and an acid or an acid derivative and methods of using such invert emulsion fluids for the treatment of at least a portion of a subterranean formation are provided. The invert emulsion fluids can be suitable for use as, for example, packer fluids and drilling fluids.

14 Claims, 1 Drawing Sheet

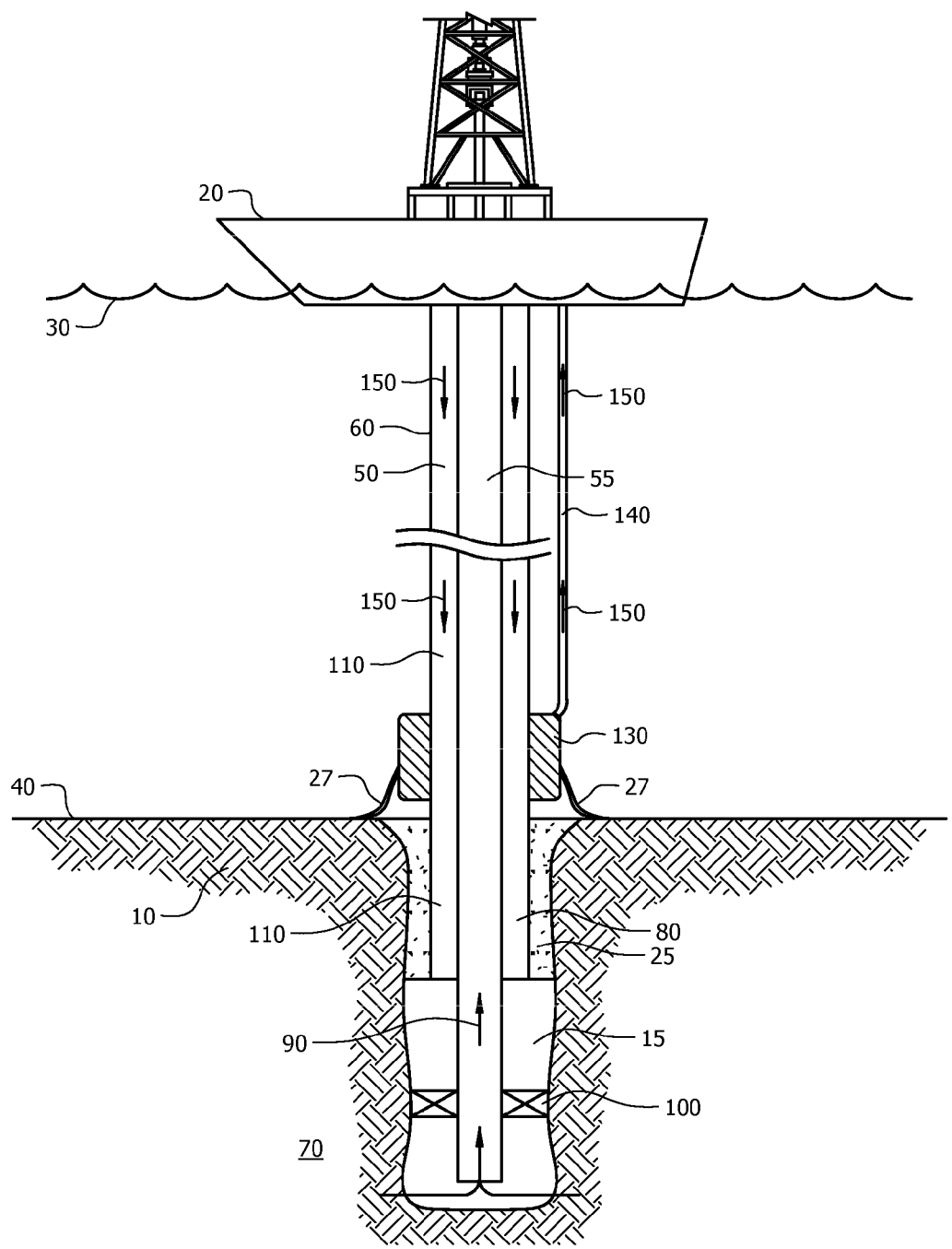

INVERT EMULSION FLUIDS

RELATED APPLICATIONS

This application is a continuation in part of U.S. patent application Ser. No. 13/939,176, filed Jul. 10, 2013, and a continuation in part of U.S. Ser. No. 13/468,022, filed May 9, 2012.

BACKGROUND

The present disclosure relates to invert emulsion fluids for use in subterranean operations, and, more specifically, to invert emulsion fluids for treating a portion of a subterranean formation.

Oil and gas hydrocarbons are naturally occurring in some subterranean formations. It is often desirable to treat at least a portion of a subterranean formation with a treatment fluid, such as a packer fluid, during hydrocarbon production. Packer fluids include liquids which are pumped into an annular opening between a casing and a wellbore wall or between adjacent, concentric strings of pipe extending into a wellbore. Packer fluids are useful for, among other things, the containment of reservoirs via hydrostatic pressure, reduction of the pressure gradient between the wellbore wall and casing to prevent wellbore collapse, and protection of metals and elastomers in wellbore conduits. In certain operations, packer fluids are used to contact a packer, such as a swellable packer or bridge plug, and can also be used for sand control, gravel packing, and workover operations.

Packer fluids are desirably compatible with the subterranean formation and possess specific mass and rheology sufficient to exert a hydrostatic pressure greater than the static pressure of the subterranean formation. It is further advantageous in many operations for packer fluids to be gellable, viscous, insulative, pumpable at low temperatures, and environmentally benign.

Conventionally, low rheology invert emulsion treatment fluids are used for, for example, deepwater drilling at cold temperatures (typically about 40° F.). Thinners are typically added to an invert emulsion treatment fluid for use in deepwater cold temperatures (typically about 40° F.), to prevent a substantial increase in the rheology of the fluid. Low rheology, however, limits the ability of treatment fluids to "pack" and/or to clean the borehole and suspend barite and drill cuttings.

Some of the desirable properties of an invert emulsion treatment fluid include good rheology, low plastic viscosity, high yield point, and high low-shear yield point. Preferably, an invert emulsion fluid is gellable, has a good shear strength, is stable, and has a suitable sag factor.

BRIEF DESCRIPTION OF THE DRAWING

These drawings illustrate certain aspects of some of the embodiments of the present disclosure, and should not be used to limit or define the disclosure.

FIG. 1 is a schematic view of an embodiment of an environment in which the disclosed invert emulsion fluids may be employed.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF SOME EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Invert emulsion fluids and methods of use are provided. The invert emulsion fluids contain a fatty dimer diamine and a short chain organic acid. In certain embodiments, the invert emulsion fluids exhibit high yield point and low-shear yield point. In certain embodiments, the invert emulsion fluids do not contain an organophilic clay. The invert emulsion fluids are suitable for use as, for example, packer fluids and drilling fluids.

A subterranean formation containing oil or gas is sometimes referred to as a reservoir. A reservoir may be located under land or off shore. In order to produce oil or gas, a well is drilled into a reservoir or adjacent to a reservoir. A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is often desirable to treat at least a portion of a well with a treatment fluid. As used herein, a "treatment fluid" is a fluid designed and prepared to resolve a specific condition of a well or subterranean formation, such as for drilling, completion, stimulation, isolation, gravel packing, or control of reservoir gas or water. The term "treatment fluid" refers to the specific composition of the fluid as it is being introduced into a wellbore. Treatment fluids can include, by way of example and not limitation, a drilling fluid, a packer fluid, a completion fluid, a spacer fluid, or a work-over fluid. The term "treatment" in the term "treatment fluid" does not necessarily imply any particular action by the fluid.

In certain embodiments of the present disclosure, treatment fluids and methods of using treatment fluids are disclosed. The disclosed treatment fluids can include, for example, packer fluids. Packer fluids are useful for, among other things, the containment of reservoirs via hydrostatic pressure, reduction of the pressure gradient between the wellbore wall and casing to prevent wellbore collapse, and protection of metals and elastomers in wellbore conduits. In certain embodiments, in certain embodiments, the disclosed packer fluids are pumped into an annular opening between a casing and a wellbore wall or between adjacent, concentric strings of pipe extending into a wellbore. In certain embodiments, the packer fluids are used to contact a packer, such as a swellable packer or bridge plug.

In certain embodiments, the disclosed packer fluids are used for sand control, gravel packing, and workover operations. The gravel packing process involves mixing gravel with a carrier fluid, and pumping the slurry into the annulus. The carrier fluid in the slurry leaks off into the formation and/or through a sand screen designed to prevent formation sand and the gravel in the slurry from flowing through it and entering the production tubing. As a result, the gravel is deposited in the annulus around the screen where it becomes tightly packed, forming a "gravel pack." Thus, gravel is deposited adjacent an open hole where it serves to prevent sand and other formation fines from flowing into the wellbore.

During well completion, it is commonly desired to seal a portion of an annulus so fluids will not flow through the annulus but rather flow through the tubing string or casing. By sealing the portion of the annulus, oil or gas can be produced in a controlled manner through the wellhead via the tubing string or casing. Different tools can be used to create seals in the well. Examples of such tools include packers and bridge plugs. A swellable packer or bridge plug can be utilized to seal the annulus in a wellbore.

In certain embodiments of the present disclosure, the disclosed packer fluids are used to contact a packer or bridge plug. The swellable packer and bridge plug can include a swellable element, which upon contact with the treatment fluid, can swell to a size that is larger than the size of the pre-swelled element. The swellable element can be a ring fitted around the outside of a portion of a tubing string or casing or a mandrel attached to either. The swellable element is normally axially constrained on the top and bottom such that the swellable element can expand in a radial direction only. As the swellable element swells, it expands radially and seals the annulus.

In certain embodiments, the invert emulsion treatment fluid is a drilling fluid. A drilling fluid or mud is typically a fluid that is circulated through a wellbore as the wellbore is being drilled to facilitate the drilling operation. During drilling operations, a wellbore is formed using a drill bit. A drill string can be used to aid the drill bit in drilling through a subterranean formation to form the wellbore. The drill string can include a drilling pipe. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. An important property of the drilling fluid is its rheology, and specific rheological parameters are preferred for drilling and circulating the fluid through the well bore. The fluid should be sufficiently viscous to suspend barite and drilled cuttings and to carry the cuttings to the well surface. However, the fluid should not be so viscous as to interfere with the drilling operation.

An invert emulsion treatment fluid may commonly comprise between about 50:50 to about 95:5 by volume oil phase to water phase. Such fluids in oil and gas production can comprise: a base oil comprising the external phase of an invert emulsion; an aqueous solution (e.g., a saline solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. In the past, such additives commonly included organophilic clays and organophilic lignites. "Clay-free" invert emulsion-based treatment fluids can offer significant advantages over fluids containing organophilic clays.

In certain embodiments of the present disclosure, the invert emulsion treatment fluid is clay-free. As used herein, the term "clay-free" (or "clayless") means a treatment fluid formulated without addition of a significant amount of organophilic clays or organophilic lignites to the drilling fluid composition. During use, such "clay-free" fluids may acquire clays and/or lignites from the formation or from mixing with recycled fluids containing clays and/or lignites. However, such contamination of "clay-free" treatment fluids is preferably avoided and organophilic clays and organophilic lignites should not be deliberately added to "clay-free" treatment fluids during drilling.

A limiting factor in treating a particular portion of a well is often the density of the treatment fluid that can be used. If a high weight treatment fluid is used, fractures may be created in lost-circulation zones with resulting loss of treatment fluid and other operating problems. If a low weight treatment fluid is used, formation fluids can encroach into the well, wellbore collapse may occur due to insufficient hydrostatic support, and in extreme cases safety can be compromised due to the possibility of a well blowout. Many times, wells are drilled through weak or lost-circulation-prone zones prior to reaching a potential producing zone, requiring use of a low weight treatment fluid and installation of sequential casing strings to protect weaker zones above the potential producing zone. An example of one drilling scenario where these issues may arise is one that combines deepwater and shallow overburden, as is typical of ultra-deepwater fields in Brazil. This scenario is characterized by high pore fluid pressure, low effective stresses, low fracturing gradients and narrow treatment fluid weight windows.

Commercially available clay-free invert emulsion treatment fluids may have lower viscosity at low treatment fluid weights, that is, treatment fluid weights ranging from about 9 ppg to about 12 ppg, with temperatures up to about 375° F. or higher. Commercially available invert emulsion treatment fluids are typically formulated with a type of mineral oil which is known to have relatively low viscosity that becomes even lower at such higher temperatures as typically encountered in deep wells. However, during offshore oil and gas production, conventional invert emulsion fluids tend to have higher viscosity passing through the drill string and risers in deep water, with temperatures averaging about 40° F. Addition of inert solids may improve the rheology, but result in a loss of or decline in other benefits seen with a clay free system. Such inert solids include, for example, fine sized calcium carbonate, and the term as used herein is not meant to be understood to include or refer to drill cuttings.

In certain embodiments, the disclosed invert emulsion treatment fluids are used in deepwater hydrocarbon production, and can advantageously exhibit sufficiently high and similar rheology from the rig floor to the riser and along the depth (or length) of the well. Such an invert emulsion fluid is typically called a "flat rheology fluid" or a "flat rheology fluid." In certain embodiments, the invert emulsion fluid has and maintains a similar rheology along the depth of a borehole, leading to a controlled equivalent circulating density (ECD) along that depth. Maintaining a similar rheology leads to less fluctuation in ECD due to changes in temperature and pressure along the depth. A controlled ECD is particularly important when the fluid enters a riser or is in the vicinity of a riser at cold temperatures, that is at temperatures of about 40° F. An invert emulsion fluid with a similar yield point (YP) and low-shear yield point (LSYP), would ensure the lowest possible frictional losses in the annulus and minimum hydraulic contribution to ECD. Reducing the hydraulic contribution to ECD, reduces the risk of exceeding the fracture gradient of the subterranean formation. Less fluctuation in ECDs can also result in fewer instances of lost circulation due to, for example, excess hydraulic pressure exertion by cold, high rheology drilling fluid.

In certain embodiments in accordance with the present disclosure, invert emulsion based treatment fluids having only a moderate plastic viscosity but possessing a high yield point and low-shear yield point, even at relatively low treatment fluid densities, are provided. In certain embodiments of the present disclosure, invert emulsion fluids exhibiting high rheology, low oil separation, and/or low susceptibility to settling of fluid additives due to specific gravitational separation (i.e., "sag") are provided. Such invert emulsion based fluids are suitable for use as, for example, packer fluids and/or drilling fluids.

The disclosed invert emulsion-based treatment fluids comprise a rheology modifier. Such rheology modifier generally comprises a fatty dimer diamine in combination with an acid, or an acid derivative. As disclosed herein, in certain embodiments, the rheology modifier imparts improved rheology and/or a relatively flat rheological profile over a broad temperature range.

In certain embodiments of the present disclosure, methods are provided which include the step of introducing the treatment fluid into at least a portion of a subterranean formation. In certain embodiments, the at least a portion of the subterranean formation is a water-sensitive formation, such as a shale formation. The step of introducing the treatment fluid can be for the purpose of drilling a wellbore, completing the wellbore, or stimulating the wellbore. The step of introducing can include contacting a swellable packer or bridge plug with the treatment fluid. The treatment fluid can be in a pumpable state before and during introduction into the subterranean formation. The treatment fluid can form a gel after introduction into the subterranean formation. The well can be an oil, gas, or water production well, or an injection well. The subterranean formation can include an annulus. The step of introducing the treatment fluid can include introducing the treatment fluid into a portion of the annulus.

In certain embodiments, the treatment fluid is a high rheology fluid. The treatment fluid can have a yield point greater than about 50, or about 60, or about 70, and can have a low shear yield point greater than about 35, or about 45, or about 55. Additionally or alternatively, the treatment fluid can have a low plastic viscosity. In certain embodiments, the plastic viscosity is lower than about 100 cP, or lower than about 80 cP, or lower than about 60 cP, or lower than about 50 cP, or lower than about 40 cP. Alternatively, or in addition to possessing high rheology and/or low plastic viscosity, the treatment fluid can have relatively low density ("weight"). In certain embodiments, the weight of the treatment fluid is below about 20 ppg, or about 16 ppg, or about 12 ppg.

In certain embodiments, the treatment fluids can additionally or alternatively exhibit substantially flat or relatively controlled and/or improved rheology at temperatures frequently encountered in deep water hydrocarbon production, that is, temperatures ranging from about 40° F. (cold) to about 180° F. or higher. In certain embodiments, the disclosed treatment fluids provide a substantially flat or relatively controlled rheology that does not increase to levels that may fracture a subterranean formation when reduced temperatures and increased pressures are encountered, such as may occur in deepwater (at least about 1000 ft depth). The treatment fluids can also exhibit similar yield points, low shear yield points, and gel strengths at temperatures ranging, or over a range of, from about 40° F. to about 180° F. or higher, indicative of flat rheology.

The present disclosure also provides in certain embodiments improved methods of drilling wellbores in subterranean formations, particularly in deep water. The method employs oil-based invert emulsion treatment fluids as disclosed herein, having a relatively flat rheological profile over a broad temperature range. As used herein, the term "drilling" or "drilling wellbores" shall be understood in the broader sense of drilling operations, which include running casing and cementing as well as drilling, unless specifically indicated otherwise.

In certain embodiments, each component of the invert emulsion treatment fluid, including the fatty diamine dimer and the acid of the rheology modifiers of the present disclosure, is environmentally benign and/or non-synthetic. For example, the invert emulsion treatment fluids of the present disclosure can be compliant with environmental regulations and standards in certain areas of the world.

In certain embodiments, the invert emulsion treatment fluid comprises, in addition to a rheology modifier as disclosed, an invert emulsion having an oil:water ratio preferably in the range of 50:50 to 95:5. In certain embodiments, the invert emulsion fluid employs a natural oil, such as for non-limiting example diesel oil or mineral oil, or a synthetic base, as the oil or oleaginous phase, and water comprising a salt such as, for non-limiting example, calcium chloride, as the aqueous phase.

The fatty dimer diamine used in certain embodiments is BDF 570® (available from Halliburton Energy Services, Inc., in Duncan, Okla. and Houston, Tex.), a C36 fatty dimer diamine having the following molecular structure:

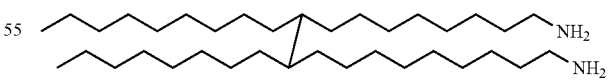

One commercially available C36 dimer diamine that may be suitable for use in certain embodiments of the present disclosure contains C18 fatty monoamine and C54 fatty trimer triamine which are obtained during the commercial production of the dimer diamine. Generally, quantities of such a fatty dimer diamine ranging from about 1 ppb to about 6 ppb are used in some embodiments and are effective even when the surrounding temperature is as low as 40° F. or above 120° F., or at a temperature in between.

The acid used in the present disclosure in one embodiment is selected from the group of acids generally consisting of boric acid, sulphonic acid, phosphonic acid, short chain organic acids, combinations thereof, and various derivatives thereof. Preferred examples of such acids suitable for use in the embodiment include, without limitation, vinyl phosphonic acid, boric acid, adipic acid, and para toluene sulphonic acid. One of ordinary skill in the art will appreciate that acids with similar structures to these can also provide good performance. Generally, the acids of the presently disclosed rheology modifiers can be provided in a concentration of about 0.1 ppb to about 20 ppb, or about 1 ppb to about 10 ppb. In certain embodiments, the acid is provided in a concentration of about 2 ppb to about 6 ppb.

In embodiments of the present disclosure providing oil-based, invert emulsion treatment fluids with a relatively flat rheological profile over a broad temperature range, and methods employing same, the term "relatively flat," as used herein with respect to a rheological profile, is a relative term based on comparison to the rheological profile of known prior art fluids without the rheology additives of the present disclosure. In certain embodiments, the treatment fluids of the present disclosure are effective in a temperature range of about 40° F. to at least about 180° F. or higher.

The oil base of the invert emulsion fluid can be a natural oil such as for example diesel oil or mineral oil, or a synthetic base such as, for example, ACCOLADE® base comprising esters or ENCORE® base comprising isomerized olefins, both available from Halliburton Energy Services, Inc., in Houston, Tex. and Duncan, Okla.

An aqueous solution containing a water activity lowering compound, composition or material can comprise the internal phase of the invert emulsion. Such an aqueous solution may comprise a saline solution comprising, for example and without limitation, calcium chloride (e.g., about 25% to about 30%, depending on the subterranean formation water salinity or activity), although other salts or water activity lowering materials such as for non-limiting example alcohols, for example, glycerol, or sugar, known in the art may alternatively or additionally be used. Such other salts may include for non-limiting example sodium chloride, sodium bromide, calcium bromide and formate salts. Water can comprise less than about 50%, or as much as about 50%, of the treatment fluid and the oil:water ratio preferably ranges from about 50:50 to about 95:5.

Invert emulsion treatment fluids of the present disclosure uniquely include a fatty dimer diamine in combination with an acid additive as a rheology modifier, as will be discussed further below. Further, the treatment fluids of, or for use in, embodiments of the present disclosure, have added to them or mixed with their invert emulsion oil base, other fluids or materials needed to comprise complete treatment fluids. Such other materials optionally may include, for example: additives for enhancing viscosity, for example, an additive having the trade name RHEMOD L™ (modified fatty acid); additives for providing temporary increased viscosity for shipping (transport to the well site) and for use in sweeps, for example, an additive having the trade name TEMPERUS™ (modified fatty acid); additives for filtration control, for example, additives having the trade names ADAPTA® and BDF-366; additives for high temperature high pressure control (HTHP) and emulsion stability, for example, an additive having the trade name FACTANT™ (highly concentrated tall oil derivative); and additives for emulsification, for example, an additive having the trade name EZ MUL® NT (polyaminated fatty acid). All of the aforementioned trademarked products are available from Halliburton Energy Services, Inc. in Houston, Tex., and Duncan, Okla., U.S.A. As with all treatment fluids, the exact formulations of the fluids can vary with the intended use of the fluid and the particular requirements of the subterranean formation.

In certain embodiments, treatment fluids according to the present disclosure can advantageously eliminate the need to include additives to provide thinning at cold temperatures, for example, additives having the trade names COLD-TROL®, ATC®, and OMC2™. In certain embodiments, treatment fluids according to the present disclosure can advantageously eliminate the need to include any additives for rheology control other than a rheology modifier according to the present disclosure. In certain embodiments, treatment fluids according to the present disclosure can advantageously eliminate the need for the use of organophilic clay as a gelling agent.

In certain embodiments in accordance with the present disclosure, the invert emulsion treatment fluids can exhibit one or more of low separation and settling, high yield point, low shear yield point, and only moderate plastic viscosity.

A commercially available treatment fluid system for use in some embodiments is the INNOVERT® drilling fluid system, having a paraffin/mineral oil base, available from Baroid, a Halliburton Company, in Houston, Tex. and Duncan, Okla. The INNOVERT® drilling fluid system may typically comprise one or more of the following additives, in addition to the paraffin/mineral oil base and brine, for use as an invert emulsion fluid: RHEMOD™ L modified fatty acid suspension and viscosifying agent, BDF-366™ or ADAPTA™ copolymer for HPHT filtration control, particularly for use at high temperatures, and EZ MUL® NT polyaminated fatty acid emulsifier/oil wetting agent, also particularly for use at high temperatures. Commercially available INNOVERT® drilling fluid systems also typically include TAU-MOD™ amorphous/fibrous material as a viscosifier and suspension agent. However, with the present disclosure, where the treatment fluid system has uniquely added thereto a fatty dimer diamine additive with an acid as a rheology modifier, TAU-MOD™ material is not necessary and is only optionally used if at all.

Embodiments of invert emulsion treatment fluids of the present disclosure comprising fatty dimer diamine with an acid, maintain acceptable and even preferred rheology measurements in deepwater oil and gas production and do not experience a decreased rate of penetration (and with clay-free invert emulsion fluids, also do not experience a decline in flatness of rheology) when in use in subterranean formations even at high pressures and high temperatures (HPHT). HPHT is understood in the industry to refer to the well conditions of a well having an undisturbed bottomhole temperature of 250° F. or greater and a pore pressure of at least 0.8 psi/ft (~15.3 lbm/gal) or requiring a blowout preventer (BOP) with a rating in excess of 10,000 psi [68.95 MPa]. At HPHT conditions, at changes in pressures and temperatures from high to low and hot to cold and various other combinations, and at high pressure-low temperature conditions, embodiments of the invert emulsion treatment fluids comprising the fatty dimer diamine with acid, have stable rheologies that do not increase sufficiently to fracture the subterranean formation and that provide similar yield point (YP), low shear yield points (LSYP) and gel strength over wide temperature and pressure ranges, such as 40° F. to 180° F. and 0 psi to about 5000 psi. These advantages are believed to be due to the addition of the fatty dimer diamine with the acid to the treatment fluid. The advantages are especially appreciated when the fluid does not also contain organophilic clay or lignite.

Commercially available fatty dimer diamines suitable for use in some embodiments include without limitation VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio and PRIAMINE™ 1071, PRIAMINE™ 1073 and PRIAMINE™ 1074 fatty C36 dimer diamine, both available from Croda Internationale Plc of Goole East Yorkshire, United Kingdom and New Castle, Del. Typically, an amount of such dimer diamine in the range of about 1 pound per barrel (ppb) to about 3 ppb is sufficient. These fatty dimer diamines are prepared commercially from fatty dimer diacids which have been produced from dimerisation of vegetable oleic acid or tall oil fatty acid by thermal or acid catalyzed methods.

The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I

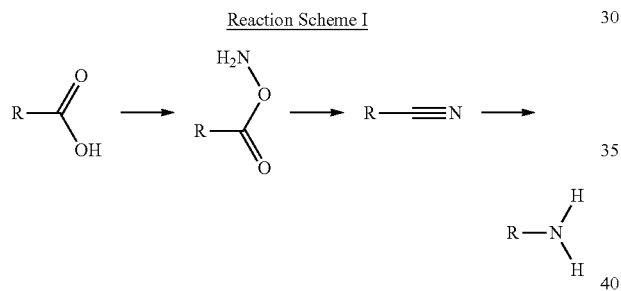

These diamines are further converted into compounds that fall under the scope of fatty dimer diamines. These diamines are converted into cyanoethyl derivatives via cyanoethylation with acrylonitrile; these cyanoethyl derivatives are further reduced into aminopropyl amines via reduction as shown in the reaction scheme II below.

Reaction Scheme II

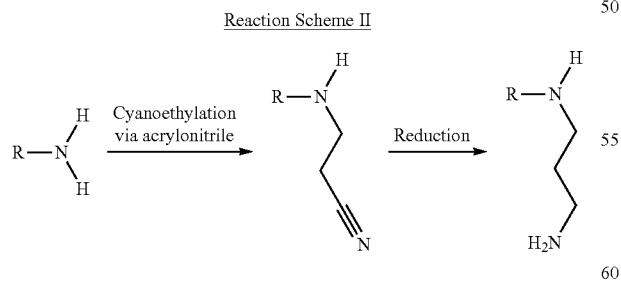

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric fatty dimer diamines are given below.

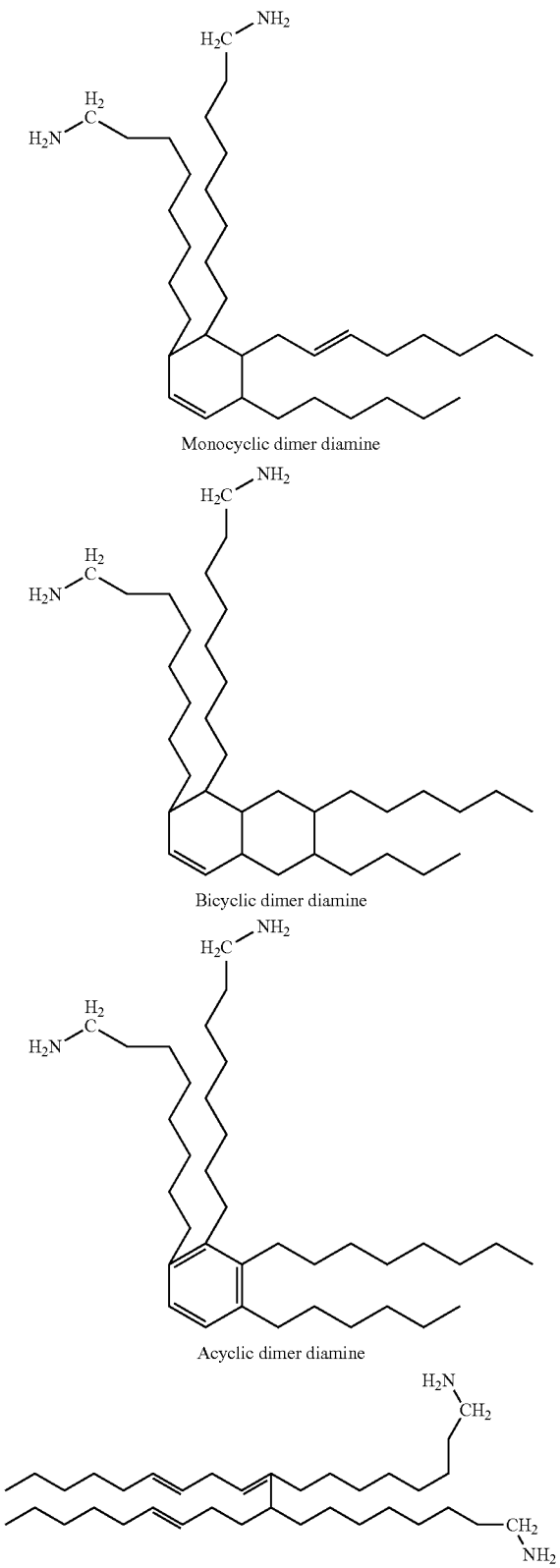

Monocyclic dimer diamine

Bicyclic dimer diamine

Acyclic dimer diamine

Other fatty dimer diamines suitable for use in embodiments of the present disclosure include C28 to C48 fatty dimer amines which are correspondingly prepared via dimerization of the relevant C14 to C24 fatty acids. It should be understood (for example) that C14 means the molecule contains in total 14 carbon atoms.

Acids particularly suited for use in embodiments of the present disclosure are boric acid, sulphonic acid, phosphonic acid, short chain organic acids, and various derivatives thereof. In one embodiment, preferred examples of such acids include, without limitation, vinyl phosphonic acid, boric acid, adipic acid, and para toluene sulphonic acid. In other embodiments, examples of such acids suitable for use include, without limitation, lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, trimesic acid, sulfuric acid, sulphinic acid, sulphamic acid, sulfonic acid, nitric acid, hydrofluoric acid, hydrochloric acid, phosphinic acid, phosphoric acid, phosphonic acid, organosulfonic acids, organophosphoric acids, boric acid, and boronic acid. Acid derivatives suitable for use in embodiments of the present disclosure, include, without limitation, carboxylic acid esters like lactic acid esters; esters of acetic acid; acetic anhydride; aliphatic polyesters; poly(lactides); poly(glycolides); poly(anhydrides); poly(ortho esters); orthoesters; esters of oxalic acid; poly(amino acids); esters of propionic acid; esters of butyric acid; esters of nitric acid, hydrolyzable organosulfonic acids, and hydrolyzable organophosphoric acids. One of ordinary skill in the art will appreciate that acids and acid derivatives with similar structures to these might also provide good performance. Such acids and acid derivatives will preferably have at least 0.1% w/w (weight of solute/weight of solution) solubility in water at 68° F. As used herein, the term "acid" with respect to an additive of or a component of the fluid of the disclosure, shall be understood to include "acid derivatives" as well as "acids," unless specifically indicated to the contrary.

In certain embodiments, the concentration of the dimer diamine is between about 0.25 ppb to about 18 ppb. In certain embodiments, the concentration of the dimer diamine is between about 2 ppb to about 5 ppb. In certain embodiments, the concentration of the acid or acid derivative is between about 0.25 ppb to about 18 ppb. In certain embodiments, the concentration of the acid or acid derivative is between about 2 ppb to about 6 ppb.

EXAMPLES

To facilitate a better understanding of the preferred embodiments, the following examples of certain aspects of the preferred embodiments are given. The following examples are not the only examples that could be given according to the preferred embodiments and are not intended to limit the scope of the claims or disclosure.

Laboratory tests demonstrate the effectiveness of certain embodiments of the present disclosure. The following examples are included to demonstrate some embodiments. It should be appreciated by those of ordinary skill in the art that the techniques and compositions disclosed in the examples which follow represent techniques that function effectively. However, those of ordinary skill in the art should, in light of the present disclosure, appreciate that many changes can be made in the specific embodiments which are disclosed and still obtain a like or similar result without departing from the scope of the claimed subject matter.

The invert emulsion treatment fluids were mixed according to the following procedures. A known volume of the external phase is added to a mixing container and the container is then placed on a mixer base. The motor of the base is then turned on and maintained at 11,000 revolutions per minute (rpm). The ingredients of each fluid are then added to the external phase and mixed for at least 5 minutes before adding the next ingredient, wherein the ingredients are added in order of the first ingredient to last ingredient. The ingredients can be added at a stated concentration of weight by volume of the treatment fluid, for example, in units of pounds per barrel of the treatment fluid. It is to be understood that any mixing is performed at ambient temperature and pressure (about 71° F. (22° C.) and about 1 atm (0.1 MPa)).

Where tests were performed at a specified temperature and/or pressure, then the temperature and pressure of the treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min). After the treatment fluid is ramped up to the specified temperature and possibly pressure, the treatment fluid is maintained at that temperature and pressure for the duration of the testing.

For the data contained in the following tables, the concentration of any ingredient in a treatment fluid is expressed as pounds per barrel of the treatment fluid (abbreviated as "ppb").

Each of the experiments or tests were conducted in accordance with standard procedures set forth in *Recommended Practice* 13*B*-2, *Recommended Practice for Field Testing of Oil-based Drilling Fluids*, Fourth Edition, American Petroleum Institute, Mar. 1, 2005, known to those of ordinary skill in the art.

Rheology is a measure of how a material deforms and flows. As used herein, the "rheology" of a treatment fluid is measured according to API 13B-2 section 6.3, Recommended Practice for Field Testing of Oil-based Treatment fluids as follows. The treatment fluid is mixed and allowed to static age for a specified period of time at a specified temperature. The treatment fluid is placed into the test cell of a rotational viscometer, such as a FANN® Model 35 viscometer, fitted with a Bob and Sleeve attachment and a spring number 1. The treatment fluid is tested at the specified temperature and ambient pressure, about 1 atm (0.1 MPa). Rheology readings are taken at multiple rpm's, for example, at 3, 6, 100, 200, 300, and 600.

The plastic viscosity ("PV") of a treatment fluid is obtained from the Bingham-Plastic rheological model and calculated as the difference between the 600 rpm and 300 rpm dial readings from the rheology testing, expressed in units of cP. A Bingham plastic is a viscoplastic material that behaves as a rigid body at low stresses but flows as a viscous fluid at high stresses.

The yield point ("YP") is defined as the value obtained from the Bingham-Plastic rheological model when extrapolated to a shear rate of zero. As used herein, the "yield point" of a treatment fluid is calculated as the difference between the plastic viscosity and the 300 rpm dial reading, expressed in units of lb/100 ft². The yield point of a material is defined as the stress at which a material begins to deform plastically. Prior to reaching the yield point, the material will deform elastically and will return to its original shape when the applied stress is removed. However, once the yield point is exceeded, some fraction of the deformation will be permanent and non-reversible. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. A more convenient means of estimating the yield stress is by calculating the low-shear yield point ("LSYP") by subtracting (2*the 3 rpm reading) from the 6 rpm reading, expressed in units of lb/100 ft2.

The gel strength ("GELS") is a measure of the suspending characteristics, or the thixotropic properties of a fluid, measured in pounds per 100 square feet (lb/100 ft²). As used herein, the gel strength of a treatment fluid was measured according to API 13B-2 section 6.3, Recommended Practice for Field Testing of Oil-based Treatment fluids as follows. After the rheology testing of the substance is performed, the substance is allowed to sit in the test cell for 10 seconds (s). The motor of the viscometer is then started at 3 rpm. The maximum deflection on the dial reading is the gel strength at 10 s in units of lb/100 ft². As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is the gel strength at 10 min in units of lb/100 ft².

Stability testing was performed according to API 131 Recommended Practice for Laboratory Testing of Treatment fluids, by placing the treatment fluid in a stainless steel aging cell. The aging cell is then pressurized with nitrogen gas to prevent the fluid from vaporizing and placed in a hot rolling oven at a specified temperature. The container is then rolled at a specified temperature for a specified time. The aging cell is then removed from the rolling oven and visually inspected to determine if the treatment fluid is stable. Fluids determined by visual inspection to be stable are resealed, repressurized with nitrogen, and stored at 250° F. for 7 days, after which storage the volume of separated oil was measured. The aging vessel has a volume of 350 mL, and separation of less than about 3-5% (i.e., 10.5 mL-17.5 mL) is considered acceptable.

Another desirable property of a treatment fluid is a good sag factor. The treatment fluid is placed into a high-temperature, high-pressure aging cell. The treatment fluid is then static aged at a specified temperature for a specified period of time. The specific gravity (SG) of the treatment fluid is measured at the top of the fluid and at the bottom part of the fluid in the aging cell. The sag factor is calculated using the following formula: $SF=SG_{bottom}/(SG_{bottom}+SG_{top})$. A sag factor of greater than 0.53 indicates that the fluid has a potential to sag; therefore, a sag factor of less than or equal to 0.53 is considered to be a good sag factor.

"HTHP" is the term used for high-temperature high-pressure fluid loss, measured in milliliters (ml) according to *Recommended Practice 13B-2, Recommended Practice for Field Testing of Oil-based Drilling Fluids*, Fourth Edition, American Petroleum Institute, Mar. 1, 2005, known to those of ordinary skill in the art. A HTHP test measures static filtration behavior of drilling fluid at elevated temperature, up to about 380° F. maximum according to the specifications of API and known to those of ordinary skill in the art. Although the test can simulate downhole temperature conditions, it does not simulate downhole pressure. Total pressure in a cell should not exceed 700 psi, and the differential pressure across the filter medium is specified as 500 psi. Because these cells are half the size of the ambient filtration area, HPHT filtrate volumes after 30 minutes are doubled.

The invert emulsion treatment fluids of the present disclosure include an oil phase, an acqueous phase, an emulsifier, and a rheology modifier as disclosed. The disclosed invert emulsion treatment fluids can further include additional chemicals suitable for use with invert emulsion fluids as known in the art, including, without limitation:

ADAPTA® crosslinked copolymer is for HTHP filtration control;

BAROID® weighting agent is ground barium sulfate;

EDC 99DW® is a base oil for drilling fluids available from TOTAL Petrochemicals USA, Inc. in Houston, Tex.;

EZ MUL® NT emulsifier, which is a polyaminated fatty acid; and

REV DUST® is an artificial drill solid available from Milwhite Inc, in Houston Tex., that does not comprise any lignite or organophilic clay. Trademarked products are available from Halliburton Energy Services, Inc., in Houston, Tex. and Duncan, Okla., unless otherwise indicated.

Example 1

Four 12 ppg Invert Emulsion Fluids (IEFs) were formulated with a 2 ppb C36 fatty dimer diamine in 12 ppg INNOVERT® clay-free invert emulsion drilling fluid (available from Halliburton Energy Services, Inc., in Duncan, Okla. and Houston, Tex.) in a 70:30 oil-water ratio having a 250K ppm $CaCl_2$ Water Phase Salinity (WPS) One of these IEFs included no acid and the other three included acids of the present disclosure, that is, one included 1.75 ppb vinyl phosphonic acid, one included 5 ppb boric acid, and one included 2.75 ppb paratoluene sulphonic acid. All four fluids were hot rolled for 16 hours at 250° F. and the rheologies determined on a FANN 35 rheometer according to API 13B-2 at 120° F. The compositions of the fluids are provided in Table 1A, and the observed rheologies are provided in Table 1.

TABLE 1A

| Additive | Mixing time (min) | Base-Fluid 1 (ppb) | Fluid 2 (ppb) | Fluid 3 (ppb) | Fluid 4 (ppb) |
| --- | --- | --- | --- | --- | --- |
| EDC 99DW | | 148.90 | 149.50 | 149.50 | 149.50 |
| EZ MUL ® NT | 2 | 11.00 | 11.00 | 11.00 | 11.00 |
| Lime | 2 | 1.30 | 1.30 | 1.30 | 1.30 |
| ADAPTA ® | 5 | 2.00 | 2.00 | 2.00 | 2.00 |
| Vinyl phosphonic acid | 5 | 0.00 | 1.75 | 0.00 | 0.00 |
| Boric acid | 5 | 0.00 | 0.00 | 5.00 | 0.00 |
| Paratoluene sulphonic acid | 5 | 0.00 | 0.00 | 0.00 | 2.75 |
| $CaCl_2$ | 5 | 29.30 | 29.30 | 29.30 | 29.30 |
| Water | | 84.70 | 84.70 | 84.70 | 84.70 |
| Revdust | 5 | 20.00 | 20.00 | 20.00 | 20.00 |
| BAROID ® | 10 | 203.20 | 202.88 | 202.88 | 202.88 |
| Fatty Dimer Diamine | 5 | 2.00 | 2.00 | 2.00 | 2.00 |

TABLE 1B

| Rheological Parameter | Fluid 1 | Fluid 2 | Fluid 3 | Fluid 4 |
|---|---|---|---|---|
| 600 rpm | 54 | 87 | 74 | 91 |
| 300 rpm | 31 | 60 | 47 | 56 |
| 200 rpm | 22 | 49 | 37 | 40 |
| 100 rpm | 14 | 36 | 26 | 26 |
| 6 rpm | 4 | 17 | 10 | 8 |
| 3 rpm | 3 | 16 | 10 | 7 |
| PV | 23 | 27 | 27 | 35 |
| YP | 8 | 33 | 20 | 21 |
| LSYP | 2 | 15 | 10 | 6 |
| GELS 10 sec | 6 | 20 | 14 | 12 |
| GELS 10 min | 8 | 29 | 25 | 22 |
| HTHP, ml/30 min (250° F.) | 2.0 | 2.0 | 1.6 | 2.0 |

As indicated in Table 1B, the base formulation (Fluid 1) of the invert emulsion fluid with the fatty dimer diamine (but no acid additive) had a YP of 8 and an LSYP of 2, whereas the formulations including the acid as well as the fatty dimer diamine each showed significantly higher rheology as determined by Yield Point and Low-Shear Yield Point. That is, the formulation with vinyl phosphonic acid (Fluid 2) had a YP of 38 (312% greater than the base formulation) and an LSYP of 15 (650% better than the base formulation); the formulation with boric acid (Fluid 3) had a YP of 20 (120% greater than the base formulation) and an LSYP of 10 (400% greater than the base formulation); and the formulation with para toluene sulphonic acid (Fluid Formulation 4) had a YP of 21 (162% greater than the base formulation) and an LSYP of 6 (200% greater than the base formulation). Addition of the acid to the fatty dimer diamine rheology modifier increases the rheological properties of the invert emulsion fluid.

Example 2

The experimental protocol of Example 1 was repeated except the rheology of samples of the different fluid formulations were tested at different temperatures for comparison of stability and dependence on temperature. That is, rheology measurements were taken at 40° F., 80° F., 120° F., and 150° F. to determine whether addition of the acid with the fatty dimer diamine would yield or impart less temperature dependence, to the invert emulsion fluid. Compositions of the various invert emulsion fluids are provided in Table 2A, 3A, 4A, and 5A, with corresponding rheologies provided in Tables 2B, 3B, 4B, and 5B.

TABLE 2A

Base Fluid 1

| Additive | Mixing time, min | Volume (ppb) |
|---|---|---|
| EDC 99DW |  | 148.90 |
| EZ MUL ® NT | 2 | 11.00 |
| Lime | 2 | 1.30 |
| ADAPTA ® | 5 | 2.00 |
| CaCl$_2$ | 5 | 29.30 |
| Water |  | 84.70 |
| Revdust | 5 | 20.00 |
| BAROID ® | 10 | 203.20 |
| Fatty Dimer Diamine | 5 | 2.00 |

TABLE 2B

Base fluid 1

| Rheological Parameter | 40° F. | 80° F. | 120° F. | 150° F. |
|---|---|---|---|---|
| 600 rpm | 156 | 81 | 54 | 42 |
| 300 rpm | 94 | 47 | 31 | 23 |
| 200 rpm | 72 | 36 | 22 | 15 |
| 100 rpm | 48 | 24 | 14 | 9 |
| 6 rpm | 15 | 6 | 4 | 3 |
| 3 rpm | 12 | 5 | 3 | 2 |
| PV | 63 | 34 | 23 | 19 |
| YP | 32 | 13 | 8 | 4 |
| LSYP | 9 | 4 | 2 | 2 |
| GELS 10 sec | 12 | 6 | 6 | 5 |
| GELS 10 min | 14 | 9 | 8 | 8 |
| HTHP, ml/30 min (250° F.) |  | 2.0 |  |  |

TABLE 3A

Adipic Acid (Fluid 5)

| Additive | Mixing time, min | Volume (ppb) |
|---|---|---|
| EDC 99DW |  | 148.90 |
| EZ MUL ® NT | 2 | 11.00 |
| Lime | 2 | 1.30 |
| ADAPTA ® | 5 | 2.00 |
| Adipic acid | 5 | 2.50 |
| CaCl$_2$ | 5 | 29.30 |
| Water |  | 84.70 |
| Revdust | 5 | 20.00 |
| BAROID ® | 10 | 202.00 |
| Fatty Dimer Diamine | 5 | 2.00 |

TABLE 3B

Adipic Acid (Fluid 5)

| Rheological Parameter | 40° F. | 80° F. | 120° F. | 150° F. |
|---|---|---|---|---|
| 600 rpm | 188 | 118 | 97 | 81 |
| 300 rpm | 107 | 73 | 60 | 52 |
| 200 rpm | 82 | 57 | 48 | 41 |
| 100 rpm | 53 | 40 | 34 | 30 |
| 6 rpm | 15 | 15 | 14 | 17 |
| 3 rpm | 14 | 13 | 13 | 15 |
| PV | 81 | 45 | 37 | 29 |
| YP | 26 | 28 | 23 | 23 |
| LSYP | 13 | 11 | 12 | 13 |
| GELS 10 sec | 26 | 17 | 22 | 22 |
| GELS 10 min | 34 | 39 | 30 | 30 |
| HTHP, ml/30 min (250° F.) |  | 2.0 |  |  |

TABLE 4A

Vinyl phosphonic acid (Fluid 2)

| Additive | Mixing time, min | Volume (ppb) |
|---|---|---|
| EDC 99DW |  | 149.50 |
| EZ MUL ® NT | 2 | 11.00 |
| Lime | 2 | 1.30 |
| ADAPTA ® | 5 | 2.00 |
| Vinyl phosphonic acid | 5 | 1.75 |
| CaCl$_2$ | 5 | 29.30 |
| Water |  | 84.70 |
| Revdust | 5 | 20.00 |
| BAROID ® | 10 | 202.88 |
| Fatty Dimer Diamine | 5 | 2.00 |

TABLE 4B

Vinyl phosphonic acid (Fluid 2)

| Rheological Parameter | 40° F. | 80° F. | 120° F. | 150° F. |
|---|---|---|---|---|
| 600 rpm | 142 | 109 | 87 | 79 |
| 300 rpm | 84 | 71 | 60 | 56 |
| 200 rpm | 66 | 58 | 49 | 47 |
| 100 rpm | 47 | 43 | 36 | 36 |
| 6 rpm | 20 | 17 | 17 | 20 |
| 3 rpm | 18 | 16 | 16 | 18 |
| PV | 58 | 38 | 27 | 23 |
| YP | 26 | 33 | 33 | 33 |
| LSYP | 16 | 15 | 15 | 16 |
| GELS 10 sec | 22 | 19 | 20 | 20 |
| GELS 10 min | 38 | 32 | 29 | 27 |
| HTHP, ml/30 min (250° F.) | | 2.0 | | |

TABLE 5A

Boric Acid (Fluid 3)

| Additive | Mixing time, min | Volume (ppb) |
|---|---|---|
| EDC 99DW, ppb | | 149.50 |
| EZ MUL ® NT, ppb | 2 | 11.00 |
| Lime, ppb | 2 | 1.30 |
| ADAPTA ®, ppb | 5 | 2.00 |
| Boric acid, ppb | 5 | 5.0 |
| $CaCl_2$, ppb | 5 | 29.30 |
| Water, ppb | | 84.70 |
| Revdust, ppb | 5 | 20.00 |
| BAROID ®, ppb | 10 | 202.88 |
| Fatty Dimer Diamine, ppb | 5 | 2.00 |

TABLE 5B

Boric Acid (Fluid 5)

| Rheological Parameter | 40° F. | 80° F. | 120° F. | 150° F. |
|---|---|---|---|---|
| 600 rpm | 139 | 94 | 74 | 67 |
| 300 rpm | 77 | 56 | 47 | 44 |
| 200 rpm | 53 | 44 | 37 | 35 |
| 100 rpm | 30 | 32 | 26 | 25 |
| 6 rpm | 11 | 15 | 10 | 12 |
| 3 rpm | 11 | 13 | 10 | 12 |
| PV | 62 | 38 | 27 | 23 |
| YP | 15 | 18 | 20 | 21 |
| LSYP | 11 | 11 | 10 | 12 |
| GELS 10 sec | 17 | 17 | 14 | 14 |
| GELS 10 min | 24 | 25 | 25 | 24 |
| HTHP, ml/30 min (250° F.) | | 1.6 | | |

The results of Example 2 show that the rheological properties of the base formulation (Fluid 1) for the invert emulsion fluid, without the acid with the fatty dimer diamine for the rheology modifier, were temperature dependent. The rheological properties decreased with the increase in temperature. The YP for Fluid Formulation 1, the base fluid, was 32 at 40° F. and gradually decreased to 4 at 150° F. The Gel Strength at 10 minutes was 14 and gradually decreased to 8 at 150° F. The 10 minute Gel provides a measure of fluid suspension.

Tables 3A and 3B present the formulation and results for the base fluid with a fatty dimer diamine and adipic acid rheology modifier of the present disclosure. The YP for this formulation was in the range of 23 to 28 from 40° F. to 150° F., the LSYP was in the range of 11 to 13 from 40° F. to 150° F. and the 10 minute Gel Strength was in the range of 30 to 39 from 40° F. to 150° F. These results indicate a relatively or substantially flat rheology, relatively or substantially independent of temperature, according to the present disclosure.

Tables 4A and 4B present the formulation and results for the base fluid with a fatty dimer diamine and vinyl phosphonic acid rheology modifier of the present disclosure. The YP for this formulation was in the range of 26 to 33 from 40° F. to 150° F., the LSYP was in the range of 15 to 16 from 40° F. to 150° F. and the 10 minute Gel was in the range of 27 to 38 from 40° F. to 150° F. These results also indicate this invert emulsion fluid formulated according to the present disclosure has a relatively or substantially flat rheology relatively or substantially independent of temperature.

Tables 5A and 5B present the formulation and results for the base fluid with a fatty dimer diamine and boric acid rheology modifier of the present disclosure. The YP for this formulation was in the range of 15 to 21 from 40° F. to 150° F., the LSYP was in the range of 10 to 12 from 40° F. to 150° F. and the 10 minute Gel was in the range of 24 to 25 from 40° F. to 150° F. Again, these results indicate flat rheology and a fluid relatively independent of temperature, according to the present disclosure.

In these experiments above, the yield point (YP) and the low shear yield point (LSYP) of the invert emulsion base fluid, which is a typical invert emulsion base fluid, without the rheology additive disclosed herein, when measured at 150° F., varied more than 500% and 250% respectively when compared to the YP and LSYP measured at 40° F. In contrast, the YP of the fluids with the rheology additive disclosed herein, Fluids 2, 3, and 5 above, measured at 150° F., did not vary by more than 30% over a temperature range of about 40° F. to about 180° F., and the LSYP of the fluid with the rheology additive disclosed herein, measured at 150° F., did not vary by more than 20% over a temperature range of about 40° F. to about 180° F.

Example 3

Base and sample 12 ppg EDC 99DW-based invert emulsion fluids were prepared having the formulations listed in Table 6 below with a 70:30 oil-water ratio and a Water Phase Salinity of 250K ppm. The sample fluid was formulated with 2 ppb C36 fatty dimer diamine (BDF 570) and 5 ppb short chain organic acid (adipic acid), while the control fluid was formulated with 2 ppb BDF 570 but without a short chain organic acid.

TABLE 6

| Additive | Mixing Time (minutes) | Base Fluid (ppb) | Sample Fluid (ppb) |
|---|---|---|---|
| EDC 99DW | | 150.6 | 148.8 |
| EZ MUL ® NT | 2 | 11.00 | 11.00 |
| Lime | 2 | 1.30 | 1.30 |
| ADAPTA ® | 5 | 2.00 | 2.00 |
| Adipic acid | 5 | 0.00 | 5.00 |
| $CaCl_2$ solution (250K ppm) | 5 | 113.7 | 112.5 |
| Revdust | 5 | 20.00 | 20.00 |
| BAROID ® | 10 | 203.30 | 201.4 |

The sample and control fluids were hot rolled for 16 hours at 250° F. and the rheologies determined on a FANN 35 rheometer according to API 13B-2 at 120° F. The results are provided in Table 7 below.

TABLE 7

| Rheological Parameter | Base Fluid | Sample Fluid |
|---|---|---|
| 600 rpm | 60 | 145 |
| 300 rpm | 32 | 110 |
| 200 rpm | 24 | 95 |
| 100 rpm | 15 | 85 |
| 6 rpm | 5 | 70 |
| 3 rpm | 4 | 64 |
| PV | 28 | 35 |
| YP | 4 | 75 |
| LS YP | 3 | 58 |
| GELS 10 sec | 6 | 62 |
| GELS 10 min | 9 | 65 |

The sample fluid exhibited outstanding rheology, as indicated by the markedly increased yield point (YP) and low shear yield point (LSYP) in Table 7 above. Only marginal increase in plastic viscosity of the sample fluid relative to the base fluid was observed.

The sample fluid was evaluated to determine its static aging performance and sag factor. After static aging for 7 days at 250° F., the sample fluid exhibited an oil separation of 2 mL, i.e., less than 1%. The sag factor of the sample fluid was 0.502, with a sag factor of 0.500 indicating no "sag" whatsoever.

Certain embodiments of the invert emulsion treatment fluids according to the present disclosure can exhibit high rheology, low viscosity, gellability, and/or low density, and can be well suited for use as packer fluids. Additionally or alternatively, the rheology modifier of the present disclosure, when used with invert emulsion fluids, can in certain embodiments enable the fluids to be used at low temperatures, such as encountered in deepwater oil and gas production, without need for a thinner. The rheology modifier of the present disclosure thus may simplify the formulation for the invert emulsion fluid and consequently saves costs. With flat rheology or substantially flat rheology, the fluid may have substantially controlled ECD (equivalent circulating density) along the drill string, notwithstanding a change in the temperature surrounding the string. A controlled ECD may avoids lost circulation of the fluid and significantly reduces the risk of formation fractures during production.

The advantages of the method of the present disclosure may be obtained by employing an invert emulsion fluid of the present disclosure in drilling operations. The drilling operations—whether drilling a vertical or directional or horizontal borehole, conducting a sweep, or running casing and cementing—may be conducted as known to those of ordinary skill in the art with other drilling fluids. That is, a drilling fluid is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the invert emulsion fluid is optimized for the particular drilling operation and for the particular subterranean formation characteristics and conditions (such as temperatures). For example, the fluid is weighted as appropriate for the formation pressures and thinned as appropriate for the formation temperatures. The fluids of the present disclosure afford real-time monitoring and rapid adjustment of the fluid to accommodate changes in such subterranean formation conditions. Further, the fluids of the present disclosure may be recycled during a drilling operation such that fluids circulated in a wellbore may be recirculated in the wellbore after returning to the surface for removal of drill cuttings for example. The drilling fluid may even be selected for use in a drilling operation to reduce loss of drilling mud during the drilling operation and/or to comply with environmental regulations governing drilling operations in a particular subterranean formation.

The exemplary rheology additives disclosed herein may directly or indirectly affect one or more components or pieces of equipment associated with the preparation, delivery, recapture, recycling, reuse, and/or disposal of the disclosed additives. For example, and with reference to FIG. 1, the disclosed additives may directly or indirectly affect one or more components or pieces of equipment associated with an exemplary wellbore drilling assembly 100, according to one or more embodiments.

Referring to the embodiment of FIG. 1, the operating environment generally comprises a wellbore 15 that penetrates a subterranean formation 10 for the purpose of recovering hydrocarbons. The wellbore may be drilled into the subterranean formation 10 using any suitable drilling technique. For example, in certain embodiments, a drilling or servicing rig may be located on an offshore floating platform 20 or drillship which may be partially submerged beneath the sea level 30. The wellbore is drilled into the formation 10 beneath a sea bed 40. In such an embodiment, the drilling or servicing rig comprises a derrick with a rig floor through which various work strings (e.g., a drill string, a tool string, a segmented tubing string, a jointed tubing string, or any other suitable conveyance, or combinations thereof) generally defining an axial flowbore may be positioned within or partially within the wellbore. In certain embodiments, such a string may comprise two or more concentrically positioned strings of pipe or tubing (e.g., a first work string may be positioned within a second work string). The drilling or servicing rig may be conventional and may comprise a motor driven winch and other associated equipment for lowering the work string into the wellbore. Alternatively, any suitable type and/or configuration of drilling and/or servicing rig may be similarly employed. In such an embodiment, one or more of the various work strings may be utilized in drilling, stimulating, completing, or otherwise servicing the wellbore, or combinations thereof. In an embodiment, the work string comprises a drill string 50.

In certain embodiments, the drill string 50, which generally defines an axial flowbore 55, may extend generally downward from sea level 30 toward the sea bed 40 through and/or within a marine riser 60, thereby generally defining an annular space 110 between the drill string 50 and the marine riser 60. In certain embodiment, the lower-most portion of the marine riser 60 may extend to, terminate at, and/or be secured to a subsea wellhead assembly, which may include a subsea tree having various components such as a blow-out preventer (BOP) or BOP stack 130. The BOP 130 may comprise any suitable configuration of valves, annular preventers, blind rams, shear rams, or combinations thereof. The BOP 130 may be located above and substantially at the sea bed 40, for example, the BOP 130 may be positioned substantially near (e.g., above, for example, directly above, the wellhead, wellbore casing, subsea tree, or the like).

In certain embodiments, the drill string 50 may extend through the BOP 130 and into the formation 10. In an embodiment, the drill string 50 may extend substantially to the end (e.g., the "toe") of the wellbore 15, for example, substantially to the full depth of the wellbore 15. For example, in the embodiment of FIG. 1 where at least a portion of the wellbore 15 is cased with a casing string 80, the annular space 110 may extend into the formation 10 and may be generally defined by the drill string 50 and the casing string 80; additionally or alternatively, in embodiments where all or a portion of the wellbore 15 is uncased, the annular space 110 may be similarly defined by the drill string 50 and the wellbore 15 (e.g., one or more wellbore walls).

While the embodiment of FIG. 1, illustrates an embodiment in which a singular annular space encases the drill string 50 (i.e., annulus 110), it will apparent to one of skill in the art that various configurations of tubular strings may be provided concentrically surrounding the drill string 50, thereby providing additional, concentrically outward annular spaces. For example, in an additional embodiment, the marine riser 60 may be further encased with in an outer tubular string, for example, a second marine riser. In such an embodiment, the marine riser 60 and the second riser may generally define a second annular space.

Additionally, while the embodiment of FIG. 1 illustrates an exemplary embodiment in the context of an offshore hydrocarbon production operation, the methods and compositions described herein are equally suitable for and contemplated for use with hydrocarbon recovery operations on land.

As will be appreciated by one of skill in the art upon viewing this disclosure, during a drilling operation, a drilling fluid may be circulated (e.g., forward circulated) into the formation 10 (e.g., into the wellbore 15) via the axial flowbore 55 of the drill string 50 and returned to the platform 20 via the annular space 110. As will also be appreciated by one of skill in the art upon viewing this disclosure, the circulation of such a drilling fluid during the drilling operation may be effective to assist in the removal of cuttings from the wellbore 15 (e.g., drill cuttings) to suspend cuttings, to control formation pressure, to cool and/or lubricate drilling equipment (e.g., bits), to maintain wellbore (e.g., open hole) stability, or combinations thereof.

Additionally, in the embodiment of FIG. 1, a packer 100 may be incorporated and/or integrated within the drill string 50 and positioned within the wellbore 15, as will be disclosed herein. In an alternative embodiment, upon completion of drilling, a production tubing and related production packer may be placed into a wellbore, for example in accordance with the layout shown in FIG. 1.

Referring to the embodiment of FIG. 1, a packer fluid may be introduced into the annular space 110 surrounding the drill string 50 (e.g., the annular space between the drill string 50 and the marine riser 60). For example, in an embodiment, the packer fluid may be circulated, for example, at a suitable flow rate through the annular space 110. In an embodiment, the packer fluid may be circulated through the annular space 110 via the operation of one or more pumps, for example, which may be located on the platform 20 of a proximate support vessel.

In an embodiment, the packer fluid may be circulated into the annular space 110 via any suitable combination of flow paths. For example, in the embodiment of FIG. 1, the packer fluid may be circulated downward through the annular space 110 and returned to the platform 20 via a secondary flowline 140 (such as a well control line or a boost line), as demonstrated by flow arrows 150. Alternatively, the packer fluid may be circulated downward through the secondary flowline 140 and upward through the annular space 110. In such an embodiment, the secondary flowline 140 may be contained within the annular space (e.g., the secondary flowline 140 may be positioned within the marine riser 60). Additionally or alternatively, the annular space 110 may be separated into at least two flowpaths, thereby allowing fluids to be circulated therethrough in both directions.

In certain embodiments, the packer fluid may be circulated to a suitable depth within the annular space 110. For example, in the embodiment of FIG. 1, the path of circulation of the packer fluid (e.g., as demonstrated by flow arrow 150) extends substantially to sea bed 40, which may be accomplished via a diverter valve 27 located in the subsea wellhead assembly or component thereof (e.g., BOP 130). Alternatively, the path of circulation may extend into the subterranean formation dependent upon the particular flow path(s) provided for the packer fluid, for example a flow path substantially similar to the flow path of drilling fluid circulated during drilling operations. In various embodiments, the packer fluid may be pumped into the desired annular space (e.g., the annular space in a marine riser extending from about the subsea wellhead to about the surface platform) and held static (e.g., pumping/circulation ceased), held dynamic (e.g., continual pumping/circulation a high, low, or varied flow rates), and/or held in combinations of static and dynamic (e.g., intermittent pumping/circulation at high, low, or varied flow rates).

In certain embodiments, the packer fluid may contact the packer to isolate a region of the wellbore. The packer fluid can exert a hydrostatic pressure on the packer sufficient to swell or lock the packer, and thereby seal a portion of the wellbore. The packer fluid can alternatively provide a medium for gravel transport to and packing at a portion of the subterranean formation. The packer fluid can additionally or alternatively provide hydrostatic support to a portion of the wellbore by its presence in an annulus surrounding the wellbore. The packer fluids as disclosed herein are suitable for these and other treatments to a wellbore and/or subterranean formation or portion thereof.

Accordingly, in certain embodiments, invert emulsion fluids and methods of using such invert emulsion fluids are provided. In certain embodiments, the invert emulsion fluid comprises a rheology modifier comprising a fatty dimer diamine having 28 to 48 carbon atoms per molecule and an acid or an acid derivative, wherein the invert emulsion fluid has a yield point greater than about 30 lb/100 ft$^2$. In certain embodiments, a method of treating an annulus of a wellbore is provided, the method comprising contacting at least a portion of the annulus with an invert emulsion fluid comprising a rheology modifier comprising a fatty dimer diamine having 28 to 48 carbon atoms per molecule and an acid or an acid derivative. In certain embodiments, a method of treating an annulus of a wellbore is provided, the method comprising contacting at least a portion of a subterranean formation with an invert emulsion fluid comprising a rheology modifier comprising a fatty dimer diamine having 28 to 48 carbon atoms per molecule and an acid or an acid derivative, wherein the invert emulsion fluid has a yield point greater than about 30 lb/100 ft$^2$.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. Moreover, the term "about" as used herein can allow for a degree of variability in a value or range, for example, within 10%, within 5%, or within 1% of a stated value or of a stated limit of a range. If there is any conflict in the usages of a word or term in this specification and one or more patent or other documents that may be incorporated herein by reference, the definitions that are consistent with this specification should be adopted.

What is claimed is:

1. A method comprising contacting at least a portion of a subterranean formation with an invert emulsion fluid comprising a rheology modifier comprising a fatty dimer diamine having 28 to 48 carbon atoms per molecule and an acid or an acid derivative, wherein the invert emulsion fluid has a sag factor of less than 0.53 and exhibits oil separation of less than 0.1% after static aging for seven days.

2. The method of claim 1, wherein the invert emulsion fluid has a yield point greater than about 50 lb/100 ft².

3. The method of claim 1, wherein the invert emulsion fluid is formulated without the addition of organophilic clays or lignites, and organophilic clays and lignites are not added to the fluid during use.

4. The method of claim 1, wherein the acid is adipic acid and the fatty dimer diamine has the following chemical structure:

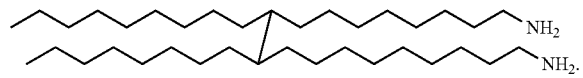 [SMILES: CCCCCCCCCC(CCCCCCCCN)C(CCCCCCCC)CCCCCCCCCN]

5. The method of claim 4, wherein the adipic acid is present in a concentration of between about 0.25 ppb to about 10 ppb and the fatty dimer diamine is present in a concentration of between about 0.25 ppb to about 18 ppb.

6. The method of claim 5, wherein the adipic acid is present in a concentration of between about 4 ppb to about 6 ppb and the fatty dimer diamine present in a concentration of between about 1 ppb to about 3 ppb.

7. The method of claim 1, wherein the 10 second gel strength at 120° F. is greater than about 50 lb/100 ft2.

8. The method of claim 1, wherein the invert emulsion fluid has a yield point greater than about 30 lb/100 ft².

9. The method of claim 1, the method further comprising contacting at least a portion of an annulus of a wellbore with the invert emersion fluid.

10. The method of claim 9, wherein the acid is adipic acid and the fatty dimer diamine has the following chemical structure:

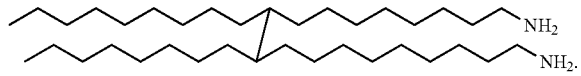 [SMILES: CCCCCCCCCC(CCCCCCCCN)C(CCCCCCCC)CCCCCCCCCN]

11. The method of claim 10, wherein the adipic acid is present in a concentration of between about 0.25 ppb to about 10 ppb and the fatty dimer diamine is present in a concentration of between about 0.25 ppb to about 18 ppb.

12. The method of claim 9, wherein the invert emulsion fluid has a yield point greater than about 30 lb/100 ft2.

13. The method of claim 1, wherein the acid is selected from the group of acids consisting of: lactic acid; formic acid; acrylic acid; acetic acid; chloroacetic acid;
    dichloroacetic acid; trichloroacetic acid; trifluoroacetic acid; propanoic acid; butyric acid;
    pentanoic acid; hexanoic acid; heptanoic acid; oxalic acid; malonic acid; succinic acid; glutaric acid; adipic acid; pimelic acid; suberic acid; azelaic acid; sebacic acid; maleic acid; fumaric acid;
    aspartic acid; citric acid; isocitric acid; aconitic acid; tartaric acid; benzoic acid; p-amino benzoic acid; phthalic acid; terephthalic acid; trimesic acid; sulfuric acid; sulphinic acid; sulphamic acid;
    sulfonic acid; nitric acid; hydrofluoric acid; hydrochloric acid; phosphinic acid; phosphoric acid;
    phosphonic acid; an organosulfonic acid; an organophosphoric acid; boric acid; boronic acid;
    carboxylic acid; para toluene sulphonic acid; vinyl phosphonic acid; and any combination thereof.

14. The method of claim 9, wherein contacting at least a portion of the annulus of the wellbore comprises contacting a swellable packer or bridge packer.

* * * * *